United States Patent Office 2,938,449
Patented May 31, 1960

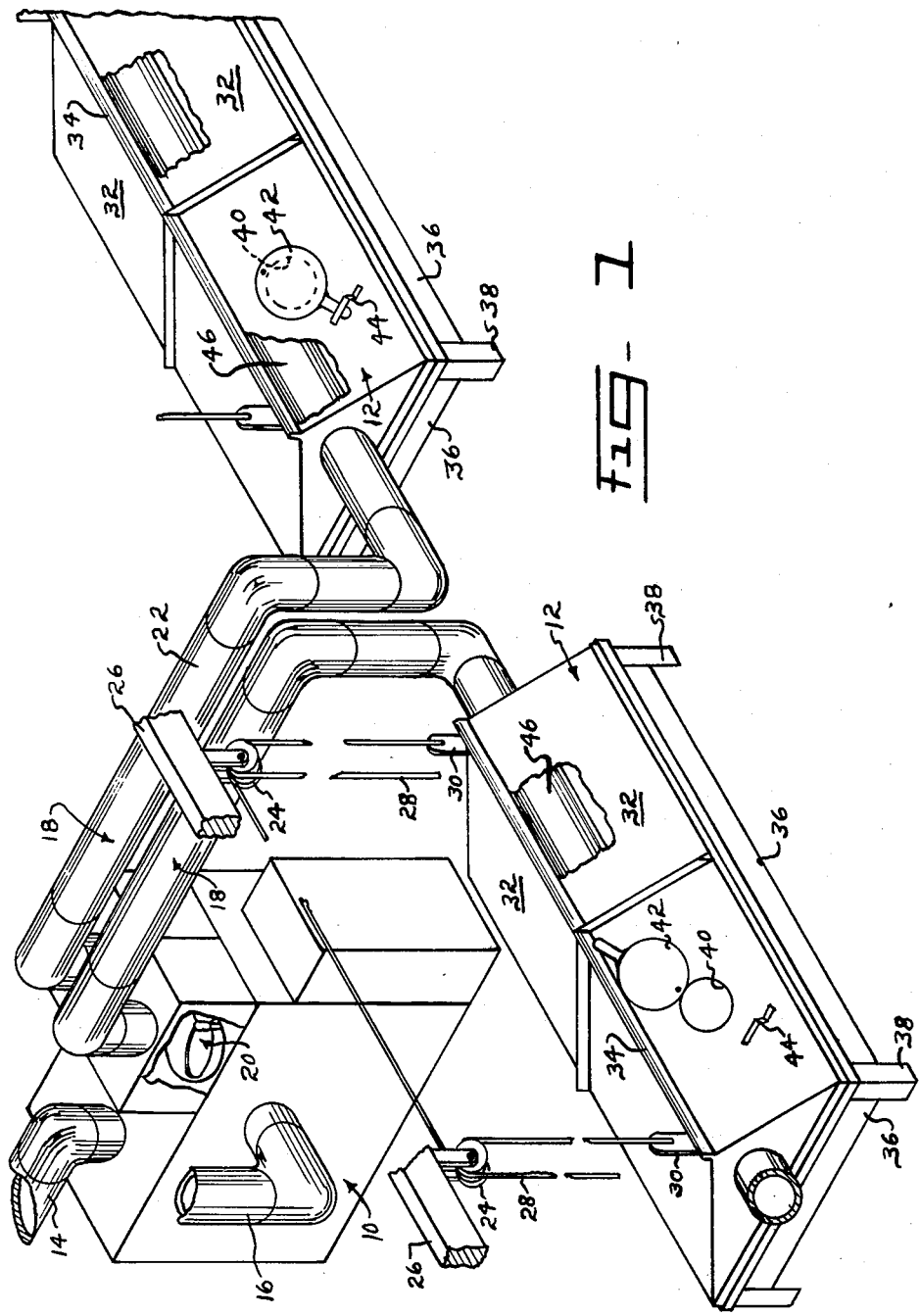

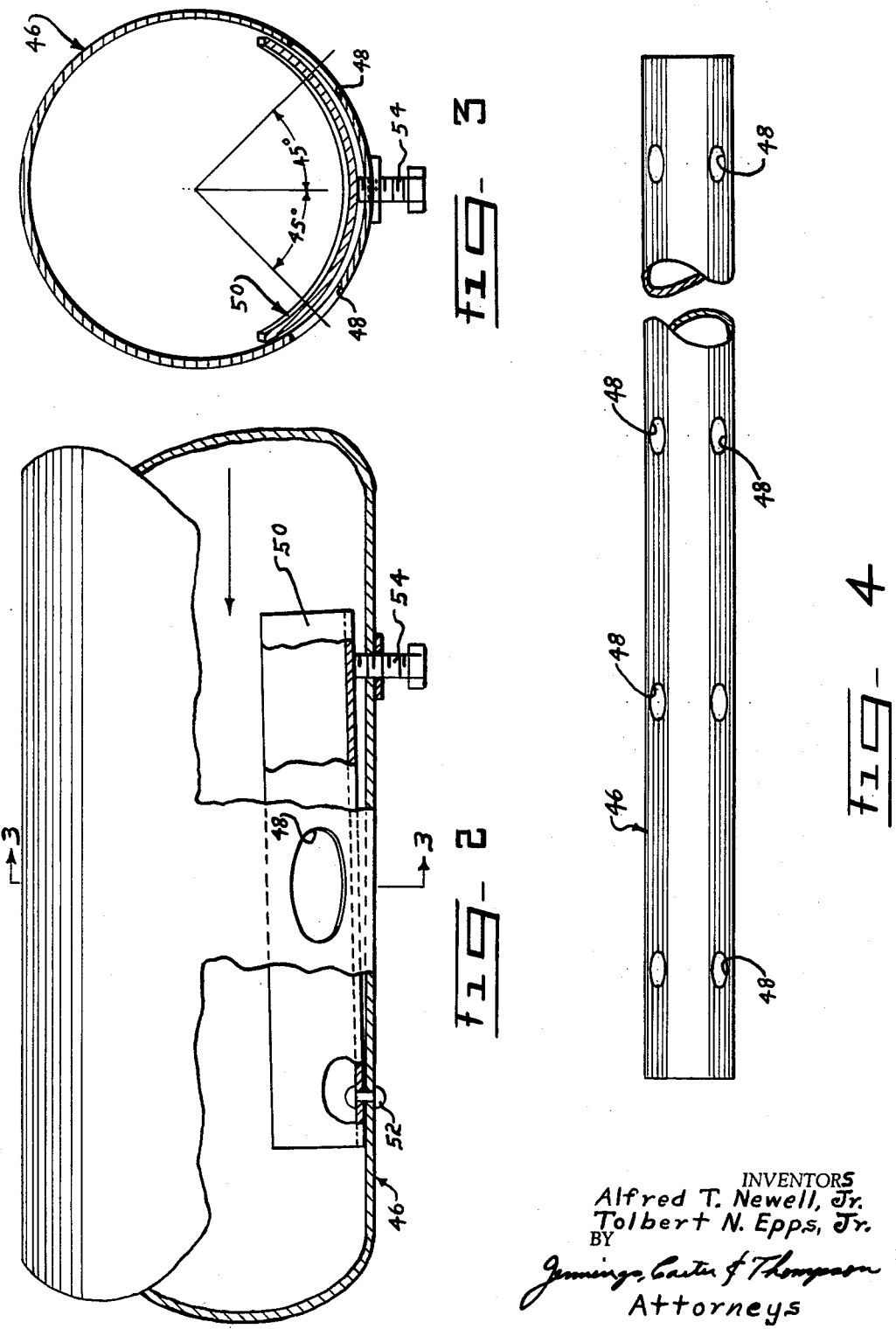

2,938,449

WARM AIR BROODER SYSTEM

Alfred T. Newell, Jr., and Tolbert N. Epps, Jr., Birmingham, Ala., assignors to De Bardeleben Coal Corporation, a corporation of Delaware Filed Nov. 4, 1957, Ser. No. 694,244

3 Claims. (Cl. 98—40)

The present invention relates to warm air brooder systems for poultry houses and more particularly to such a brooder system embodying coal heating means and deflectors within the air conductors.

As is well known in the raising of poultry, it is desirable to provide a warm, dry, atmosphere in brooders and poultry houses as it has been found by many poultry growers that respiratory diseases are decreased considerably if a dry atmosphere is maintained in the poultry house. In heating means such as natural gas, a damper atmosphere than is provided by coal heat is maintained as only a small amount of moisture is given off by the burning of coal and a considerable portion of that amount is exhausted through a flue. Thus, coal heating means for poultry houses has been found to work most effectively and to produce a desirable dry heat.

It is an object of our invention to provide a brooder system embodying a coal heating means so that a comparatively dry heat may be maintained in the brooders.

It is a further object of our invention to provide a brooder system having coal heating means and a fresh air intake pipe connected thereto whereby a continuous supply of fresh air is first supplied to the heating means and clean heated air is next conducted to the brooders from the heating means.

It is an additional object of our invention to provide a brooder system having air conductors with adjustable deflectors arranged over openings in the conductors whereby heated air passing through the conductors will be controlled and deflected downwardly through the openings and into the brooders.

A brooder system embodying features of our invention is illustrated in the accompanying drawings, in which:

Fig. 1 is a perspective view of our warm air brooder system embodying the present invention;

Fig. 2 is a partially cut-away side elevational view of an air conductor in the brooder of our invention;

Fig. 3 is a transverse cross-sectional view taken along the line 3—3 of Fig. 2; and Fig. 4 is a bottom plan view of the air conductor for use within a brooder.

Referring now to the drawings for a further explanation of our invention, we show in Fig. 1 the warm air brooder system embodying our invention which is particularly adaptable for use in poultry houses. The system is normally placed on the floor of a poultry house and coal heating means 10 comprising a stoker and furnace is suitably positioned in a central portion of the poultry house so that a line of brooders 12 can be arranged in end-to-end relation on each side of the coal heating means 10. A fresh air intake pipe 14 is connected to the coal heating means 10 and extends outside the poultry house so that a continuous supply of fresh air is maintained for the brooders 12. A flue 16 extends upwardly from heating means 10 and practically all of the combustion products of the coal burned in heating means 10 are emitted through the flue 16. Thus, condensation or water vapor within the poultry house is kept to a minimum by the use of a coal heating means employing coal as a fuel.

Air conductors 18 extend from the top of coal heating means 10 and heated air is conveyed through the air conductors 18 by the use of suitable blower means 20 positioned on the heating means 10 and may comprise a fan. While a separate air conductor 18 is shown for each of the brooders 12 on opposite sides of the coal heating means 10, it is understood that one air conductor 18 can be used, if desired, and by means of a Y-joint, heated air can be conducted to the brooders 12 on the opposite sides. Also, while only one brooder 12 is shown on each side of means 10, it should be understood that in normal operation, a plurality of brooders 12 spaced approximately eight feet apart will extend from each side of coal heating means 10 and will be aligned in the poultry house in single or plural lines. It should be noted that the air conductors 18 between the brooders 12 are in close proximity to the brooder floor so that heat loss therefrom will be utilized by the poultry.

Air conductors 18 are composed of a plurality of removable circular sections of pipe 22 which sections can be disconnected adjacent the ends of a brooder 12 and thereby allow brooders 12 to be removed or raised above the level of the brooder floor, if desired to give the poultry more room as they grow larger or to remove the brooders to inactive position. If desired, a flexible connection can be provided for the brooders 12 that are arranged adjacent the coal heating means 10 and a material that we have found to work most effectively is wire reinforced canvas covered with a rubber material such as the product sold under the trade name "Portovent" and manufactured by The Flexaust Company.

To accomplish raising of brooder 12, a suitable pulley 24 is provided on the overhead rafters 26 of the poultry house and a cable 28 is suitably attached to each end of the brooders 12 by means of a bracket 30 whereby the brooder can be easily raised or lowered by manual or mechanical operation, either separately or collectively.

Each of the brooders 12 comprises a pair of inclined wings 32 intersecting to form the apex 34 of the brooder 12. Suitable curtains 36 made of canvas or other flexible material extend downwardly from the wing 32 so as to keep the heated air enclosed within the brooders 12 and also to prevent drafts from circulating along the brooder floor. The curtains 36 are easily displaced when the poultry moves thereunder. Suitable supports or legs 38 are provided at the corners of the brooders 12 and rest on the poultry house floor. In order for a visual inspection to be made of the poultry housed under the brooders 12, a peep-hole 40 is shown in one of the wings 32 and is provided with a pivoted peep-hole cover 42 which is normally held in place by an upstanding bracket member 44 secured to wing 32. Thus, if it is desired to check the poultry under the brooders 12, it is only necessary to pivot the peep-hole cover 42 away from peep-hole 40.

Referring now to Figs. 2, 3 and 4, a portion or section 46 of air conductor 18 is enclosed within brooder 12 and is positioned under the apex 34, as shown in Fig. 1. The enclosed section 46 is provided with a plurality of openings 48 which openings are preferably arranged in pairs and spaced longitudinally at about two foot intervals. The openings 48 can be of any desired shape, but for the purpose of illustration are shown in a circular contour. It has been found that if each of the openings 48 of a pair is spaced approximately 45° from the vertical axis of the pipe as shown in Fig. 3, that best heating results will be obtained for the brooder 12. This particular location of openings 48 provides an even and uniform distribution of heated air under brooders 12 and the heated air is diffused in such a manner as not to cause a draft directly on the poultry.

Each pair of openings 48 has an individual deflector 50 arranged thereover and is adapted for closely covering the opening 48 so that no heated air can pass therethrough or for adjustment so that any desired amount of heated air can be deflected through the openings 48 into the brooder 12. The deflector 50 is formed of a resilient material and is arcuate in contour so as to fit closely against the inner surface of the enclosed portion 46. Deflector 50 is secured at one end by securing means 52 which may comprise a suitable rivet. The other end of deflector 50 is arranged over an adjusting screw 54 which is adapted to raise and lower the resilient deflector 50 through contact with the lower surface thereof. The raising of deflector 50 by the adjusting screw 54 creates a torque about the securing means 52 and upon the lowering of the adjusting screw 54, the deflector 50 will automatically follow the movement thereof. The arrow in Fig. 2 indicates the direction of heated air flow through section 46 and it is evident that upon a raising of deflector 50, a portion of the air flow will be directed under deflector 50 and into the brooder 12 through openings 48. The air flow through each pair of openings 48 can be gauged separately without regard to the air flow through any other pair of openings 48 and if it is desired to have more air in the ends of the brooder 12 than in the center, such adjustment can be easily made.

It should be noted that no means for recirculating the heated air are provided and foul air is exhausted through ventilators suitably arranged in the roof or walls of the poultry house. Thus, a continuous supply of fresh air is brought in through the fresh air intake 14 to the coal heating means 10 and is conveyed through the air conductors 18.

From the foregoing, it will be seen that we have devised an improved warm air brooder system for poultry houses comprising coal heating means continuously receiving a supply of fresh air from the outside atmosphere with the air heated by the heating means and conveyed through air conductors by blower means with individual deflectors arranged over longitudinally spaced openings in the air conductor so as to deflect the air through the openings while allowing individual adjustment for the longitudinally spaced openings.

While we have shown our invention in but one form, it will be obvious to those skilled in the art that it is not so limited but is susceptible of various changes and modifications without departing from the spirit thereof, and we desire, therefore, that only such limitations shall be placed thereupon as are specifically set forth in the appended claims.

What we claim is:

1. In a poultry heating system having a brooder with inclined intersecting wings forming an apex, a circular air conductor positioned within the brooder beneath the apex and having openings horizontally spaced at intervals along the length of said conductor, an arcuate deflector arranged over and covering the openings at each interval and fitting closely against the inner periphery of the conductor, means securing the deflector at one end to the inner periphery of the air conductor, said deflector being formed of a resilient material and held in contact relation with the inner periphery of the conductor by the securing means, the other end of the deflector being unsecured to the conductor, and adjustable means to move said other end away from said inner periphery and flexing said deflector about said securing means whereby air passing through said air conductor may be deflected by said deflector through the openings into the brooder, said other end returning toward said inner periphery through the resilience of said deflector upon proper adjustment of said adjustable means.

2. In a heating system for poultry having a brooder, the improvement comprising a horizontally extending circular air conductor positioned within the brooder at the top thereof and having pairs of openings longitudinally spaced at intervals along the length of the conductor, an arcuate deflector positioned in contact with the inner periphery of the air conductor and arranged in covering relation over the openings at each interval, said deflector being formed of a resilient material and secured at one end to the air conductor, and means at the other end of the deflector to adjust said deflector toward and away from said inner periphery whereby heated air passing through said air conductor may be adjustably controlled by said deflector and deflected thereby into the brooder through the openings.

3. A brooder system as defined in claim 2 and further characterized in that the pairs of openings are arranged at about a 45° angle to the vertical axis of the brooder.

References Cited in the file of this patent

UNITED STATES PATENTS

| | | |
|---|---|---|
| 1,317,614 | Clapp | Sept. 30, 1919 |
| 2,059,819 | Smith | Nov. 3, 1936 |
| 2,159,219 | Madden | May 23, 1939 |
| 2,311,195 | Young | Feb. 16, 1943 |
| 2,423,241 | Kurth | July 1, 1947 |
| 2,593,029 | Holdredge | Apr. 15, 1952 |